United States Patent
Huber et al.

(10) Patent No.: US 8,516,466 B2
(45) Date of Patent: Aug. 20, 2013

(54) OPTIMIZATION OF AUTOMATED SYSTEM-MANAGED STORAGE OPERATIONS

(75) Inventors: Harold S. Huber, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 12/827,003

(22) Filed: Jun. 30, 2010

(65) Prior Publication Data

US 2012/0005657 A1 Jan. 5, 2012

(51) Int. Cl.
*G06F 9/45* (2006.01)

(52) U.S. Cl.
USPC .......................... 717/154; 717/161

(58) Field of Classification Search
USPC .................. 717/151, 154, 159, 161
See application file for complete search history.

(56) References Cited

U.S. PATENT DOCUMENTS

| | | | |
|---|---|---|---|
| 4,924,376 A * | 5/1990 | Ooi | 712/207 |
| 5,495,603 A | 2/1996 | Fruchtman et al. | |
| 6,006,033 A | 12/1999 | Heisch | |
| 8,151,067 B2 * | 4/2012 | Abel et al. | 711/158 |
| 2004/0010751 A1 * | 1/2004 | Merkel et al. | 715/509 |
| 2005/0144515 A1 * | 6/2005 | Yano et al. | 714/7 |
| 2009/0138682 A1 * | 5/2009 | Capps et al. | 712/220 |
| 2009/0182777 A1 | 7/2009 | Bolik et al. | |
| 2009/0216962 A1 * | 8/2009 | Mutlu et al. | 711/151 |
| 2010/0030806 A1 * | 2/2010 | Kuhlke et al. | 707/104.1 |
| 2011/0164039 A1 * | 7/2011 | Anklam et al. | 345/440 |

FOREIGN PATENT DOCUMENTS

| | | |
|---|---|---|
| EP | 0381651 B1 | 11/1996 |
| JP | 06139195 | 5/1994 |

OTHER PUBLICATIONS

"Storage Management Automation," IBM, IP.com, IPCOMM000143254D, Nov. 17, 2006, 2 pages.

* cited by examiner

*Primary Examiner* — Anna Deng
(74) *Attorney, Agent, or Firm* — Griffiths & Seaton PLLC

(57) ABSTRACT

Various embodiments for optimizing automated system-managed storage (SMS) operations in a computing storage environment. An execution of at least one automatic class selection (ACS) routine is monitored to determine at least one frequently used instruction. The ACS routine is modified for at least one predetermined time interval. The at least one frequently used instruction is moved to a higher execution priority of the modified ACS routine.

18 Claims, 7 Drawing Sheets

```
PROC STORCLAS                                              00010000
/*                       START FILTLISTS           */      00020011
FILTLIST VALIDSC INCLUDE('PAYROLL','DB2','TSO')             00030010
FILTLIST PAYROLL INCLUDE(PAYROLL*)                          00040010
FILTLIST DB2 INCLUDE(DSN*)                                  00050010
/*                       END FILTLISTS             */      00060011
/*********************************************************/  00070011
/*                       START SC LOGIC            */      00080011
                                                           00090000
/*SETSTART*/                                               00100011
IF (&HLQ = 'SYS1') THEN                                    00110001
   DO                                                      00120000
       SET &STORCLAS = ''                                  00130000
       EXIT                                                00140000
   END                                                     00150000
/*SETEND*/                                                 00160011
                                                           00170000
/*SETSTART*/                                               00180011
IF (&STORCLAS = &VALIDSC) THEN                             00190000
   DO                                                      00200000
       SET &STORCLAS = &STORCLAS                           00210000
       EXIT                                                00220000
   END                                                     00230000
/*SETEND*/                                                 00240011
                                                           00250005
/*SETSTART*/                                               00260015
IF (&HLQ = &DB2) THEN                                      00270015
   DO                                                      00280015
       SET &STORCLAS = 'DB2'                               00290015
       EXIT                                                00300015
   END                                                     00310015
/*SETEND*/                                                 00320015
                                                           00330015
/*SETSTART*/                                               00340015
IF (&DSN(2) = SPF*) THEN                                   00350015
   DO                                                      00360015
       SET &STORCLAS = 'TSO'                               00370015
       EXIT                                                00380015
   END                                                     00390015
/*SETEND*/                                                 00400015
                                                           00410015
/*SETSTART*/                                               00420014
IF &DSN(1) = &PAYROLL THEN                                 00430014
   DO                                                      00440014
       SET &STORCLAS = 'PAYROLL'                           00450014
       EXIT                                                00460014
   END                                                     00470014
/*SETEND*/                                                 00480014
                                                           00490014
/*SETSTART*/                                               00500011
ELSE                                                       00510000
   SET &STORCLAS = ''                                      00520000
END                                                        00530000
/*SETEND*/                                                 00540011
                                                           00550000
/*                       END SC LOGIC             */      00550011
```

```
PROC STORCLAS                                              00010000
/*                    START FILTLISTS              */      00020011
FILTLIST VALIDSC INCLUDE('PAYROLL','DB2','TSO')             00030010
FILTLIST PAYROLL INCLUDE(PAYROLL*)                          00040010
FILTLIST DB2 INCLUDE(DSN*)                                  00050010
/*                    END FILTLISTS               */       00060011
/***************************************************/     00070011
/*                    START SC LOGIC               */      00080011
                                                           00090000
/*SETSTART*/                                               00260015
IF (&HLQ = &DB2) THEN                                      00270015
   DO                                                      00280015
        SET &STORCLAS = 'DB2'                              00290015
        EXIT                                               00300015
   END                                                     00310015
/*SETEND*/                                                 00320015
                                                           00330015

/*SETSTART*/                                               00340015
IF (&DSN(2) = SPF*) THEN                                   00350015
   DO                                                      00360015
        SET &STORCLAS = 'TSO'                              00370015
        EXIT                                               00380015
   END                                                     00390015
/*SETEND*/                                                 00400015
                                                           00410015

/*SETSTART*/                                               00100011
IF (&HLQ = 'SYS1') THEN                                    00110001
   DO                                                      00120000
        SET &STORCLAS = ''                                 00130000
        EXIT                                               00140000
   END                                                     00150000
/*SETEND*/                                                 00160011
                                                           00170000

/*SETSTART*/                                               00180011
IF (&STORCLAS = &VALIDSC) THEN                             00190000
   DO                                                      00200000
        SET &STORCLAS = &STORCLAS                          00210000
        EXIT                                               00220000
   END                                                     00230000
/*SETEND*/                                                 00240011
                                                           00250005

/*SETSTART*/                                               00420014
IF &DSN(1) = &PAYROLL THEN                                 00430014
   DO                                                      00440014
        SET &STORCLAS = 'PAYROLL'                          00450014
        EXIT                                               00460014
   END                                                     00470014
/*SETEND*/                                                 00480014
                                                           00490014

/*SETSTART*/                                               00500011
ELSE                                                       00510000
   SET &STORCLAS = ''                                      00520000
END                                                        00530000
/*SETEND*/                                                 00540011
                                                           00550000
/*                    END SC LOGIC                */
```

FIG. 3B

```
PROC STORCLAS                                                    00010000
/*                      START FILTLISTS          */              00020011
FILTLIST VALIDSC INCLUDE('PAYROLL','DB2','TSO')                  00030010
FILTLIST PAYROLL INCLUDE(PAYROLL*)                               00040010
FILTLIST DB2 INCLUDE(DSN*)                                       00050010
/*                       END FILTLISTS           */              00060011
/***************************************************/            00070011
/*                      START SC LOGIC            */              00080011
                                                                 00090000
/*SETSTART*/                                                     00100013
IF &DSN(1) = &PAYROLL THEN                                       00110013
  DO                                                             00120013
       SET &STORCLAS = 'PAYROLL'                                 00130013
       EXIT                                                      00140013
  END                                                            00150013
/*SETEND*/                                                       00160013
                                                                 00170013
/*SETSTART*/                                                     00180012
IF (&HLQ = &DB2) THEN                                            00190012
  DO                                                             00200012
       SET &STORCLAS = 'DB2'                                     00210012
       EXIT                                                      00220012
  END                                                            00230012
/*SETEND*/                                                       00240012
                                                                 00250012
/*SETSTART*/                                                     00260012
IF (&DSN(2) = SPF*) THEN                                         00270012
  DO                                                             00280012
       SET &STORCLAS = 'TSO'                                     00290012
       EXIT                                                      00300012
  END                                                            00310012
/*SETEND*/                                                       00320012
                                                                 00320013
/*SETSTART*/                                                     00330011
IF (&HLQ = 'SYS1') THEN                                          00340001
  DO                                                             00350000
       SET &STORCLAS = ''                                        00360000
       EXIT                                                      00370000
  END                                                            00380000
/*SETEND*/                                                       00390011
                                                                 00400000
/*SETSTART*/                                                     00410011
IF (&STORCLAS = &VALIDSC) THEN                                   00420000
  DO                                                             00430000
       SET &STORCLAS = &STORCLAS                                 00440000
       EXIT                                                      00450000
  END                                                            00460000
/*SETEND*/                                                       00470011
                                                                 00480005
/*SETSTART*/                                                     00490011
ELSE                                                             00500000
  SET &STORCLAS = ''                                             00510000
END                                                              00520000
/*SETEND*/                                                       00530011
                                                                 00540000
/*                      END SC LOGIC             */              00550011
```

FIG. 3C

OPTIMIZATION OF AUTOMATED SYSTEM-MANAGED STORAGE OPERATIONS

BACKGROUND OF THE INVENTION

1. Field of the Invention

The present invention relates in general to computers, and more particularly to a method, system, and computer program product for optimizing automated system-managed storage (SMS) operations in a computing storage environment.

2. Description of the Related Art

The majority of businesses in the world today use computers and computer operating systems to store and manage information. Typically, such information is stored and managed in interconnected storage systems. Because such systems may be complex, involving many interconnected storage devices, communication paths, and the like, such systems generally require management functionality performed by such devices as storage controllers. To further automate and simplify the storage, management, and retrieval of information, so-called "system-managed storage" allows the operating system (OS) operable in such storage environments to facilitate many storage management tasks that were previously manually performed by personnel such as system administrators.

A storage environment without system-managed storage is analogous to an airport without air traffic controllers. Allocations and deletions of storage resources occur with little or no control, on whichever storage unit (such as a volume) the person performing the allocation happens to choose. Some volumes may be highly utilized in terms of both space and performance while others are sitting idle. In a storage environment, a collision can be said to occur when a data set allocation fails because there is no space on the volume on which the allocation was attempted.

System-managed storage addresses this problem by placing device selection under the control of the system. The system does this using a policy established by the storage administrator who defines a volume pooling structure made up of storage groups. The storage administrator also writes straightforward automatic class selection (ACS) routines that define which data sets can be allocated in which storage groups. Using these ACS routines, the storage administrator can allow the system to control as much or as little allocation of storage groups as desired.

When a new allocation occurs, the system uses the ACS routines to determine a set of storage groups in which the data set is eligible to be allocated. The system then considers criteria such as space and performance to select the specific volume or volumes on which to perform the allocation. This can help reduce the number of out of space abends, reduce device fragmentation, balance allocations across a pool of devices, and improve storage utilization.

SUMMARY OF THE INVENTION

In today's environment, performance throughput is increasingly demanded. ACS routines while helpful to allocate storage resources as previously described, also present challenges and create bottlenecks in getting the appropriate storage resources allocated to jobs. When a data set is initially allocated, the ACS routines are driven to assign the storage attributes of the data set. This action requires processor resources, which is not tied directly to the job itself, and falls into unaccounted for central processor unit (CPU) time. This unaccounted for CPU time makes it difficult for clients to accurately bill for CPU usage. Accordingly, reducing CPU time required by ACS routines has a double benefit.

In light of the foregoing, a need exists for a mechanism to monitor the ACS routines, provide information to the client/user that should enable him to better tune the routines to the environment and optionally dynamically modify the routines. Accordingly, various embodiments for optimizing automated system-managed storage (SMS) operations in a computing storage environment are provided. In one such embodiment, by way of example only, a method for optimizing automated system-managed storage (SMS) operations in a computing storage environment is provided. An execution of at least one automatic class selection (ACS) routine is monitored to determine at least one frequently used instruction. The ACS routine is modified for at least one predetermined time interval. The at least one frequently used instruction is moved to a higher execution priority of the modified ACS routine.

Additional system and computer program product embodiments are provided and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3A is an exemplary unoptimized ACS routine written by a user;

FIG. 3B is an additional exemplary ACS routine that has been optimized for a non-payroll window;

FIG. 3C is an additional exemplary ACS routine that has been optimized for a payroll window;

DETAILED DESCRIPTION OF THE DRAWINGS

The present description and claimed subject matter describe exemplary system, method, and computer program product embodiments for optimizing automated system-managed storage (SMS) operations in a computing storage environment such as ACS routines. These embodiments provide mechanisms to monitor the ACS routines, provide information to the client/user enabling him to better tune the routines to the particular storage environment and associated operating conditions, and optionally dynamically modify the routines. In addition, the illustrated embodiments, following, may be tuned for various time intervals, such as a particular time of day or day of the week. For example, one set of ACS routines may be adapted to be efficient during a day/production window, but otherwise would be inefficient if executed at night during a batch cycle.

Figure 1:
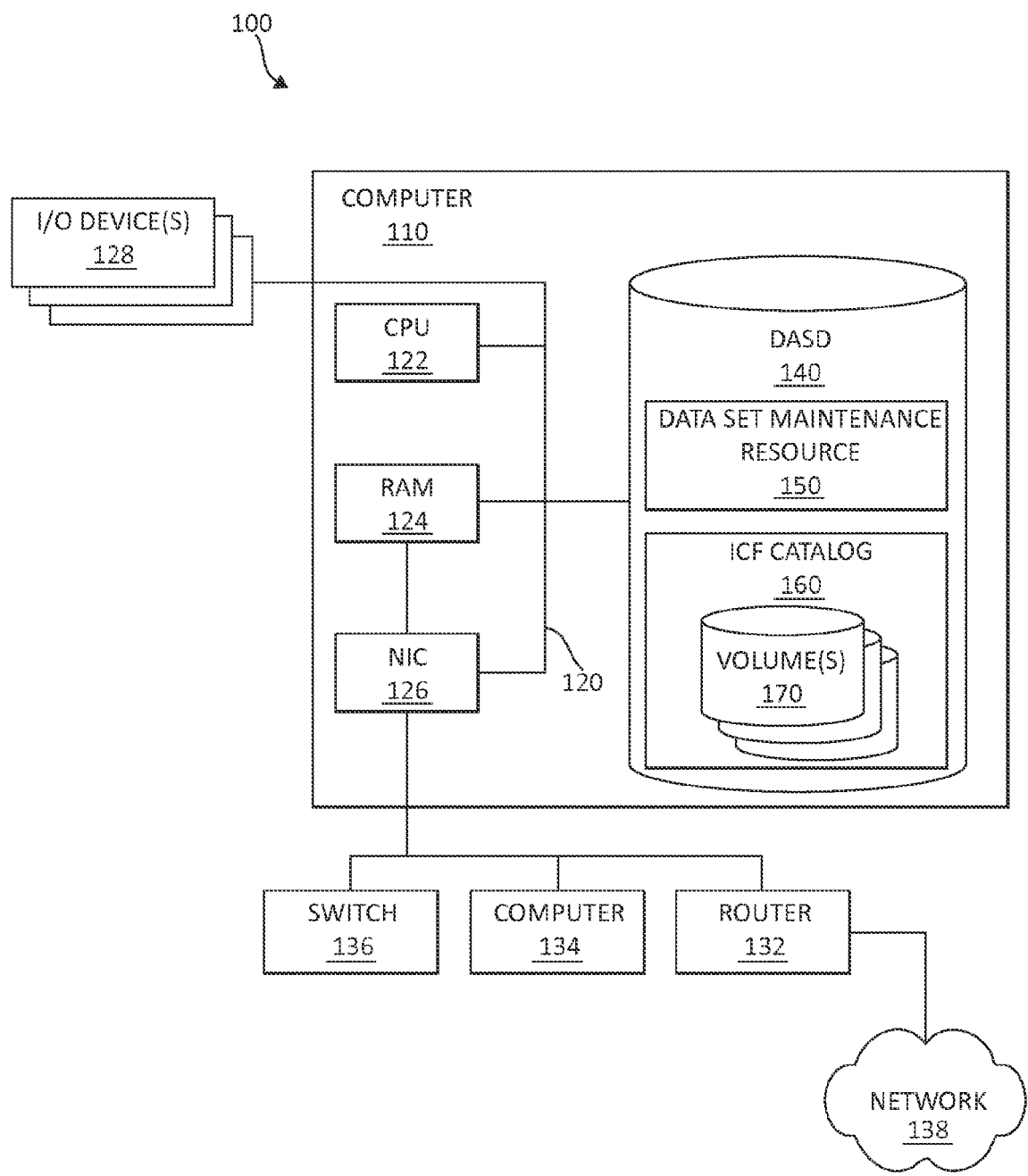
FIG. 1 is an exemplary computing environment.

FIG. 1 depicts one embodiment of a computer system for optimizing SMS operations in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set recovery resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set recovery resource 150. In the depicted embodiment, the data set recovery resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
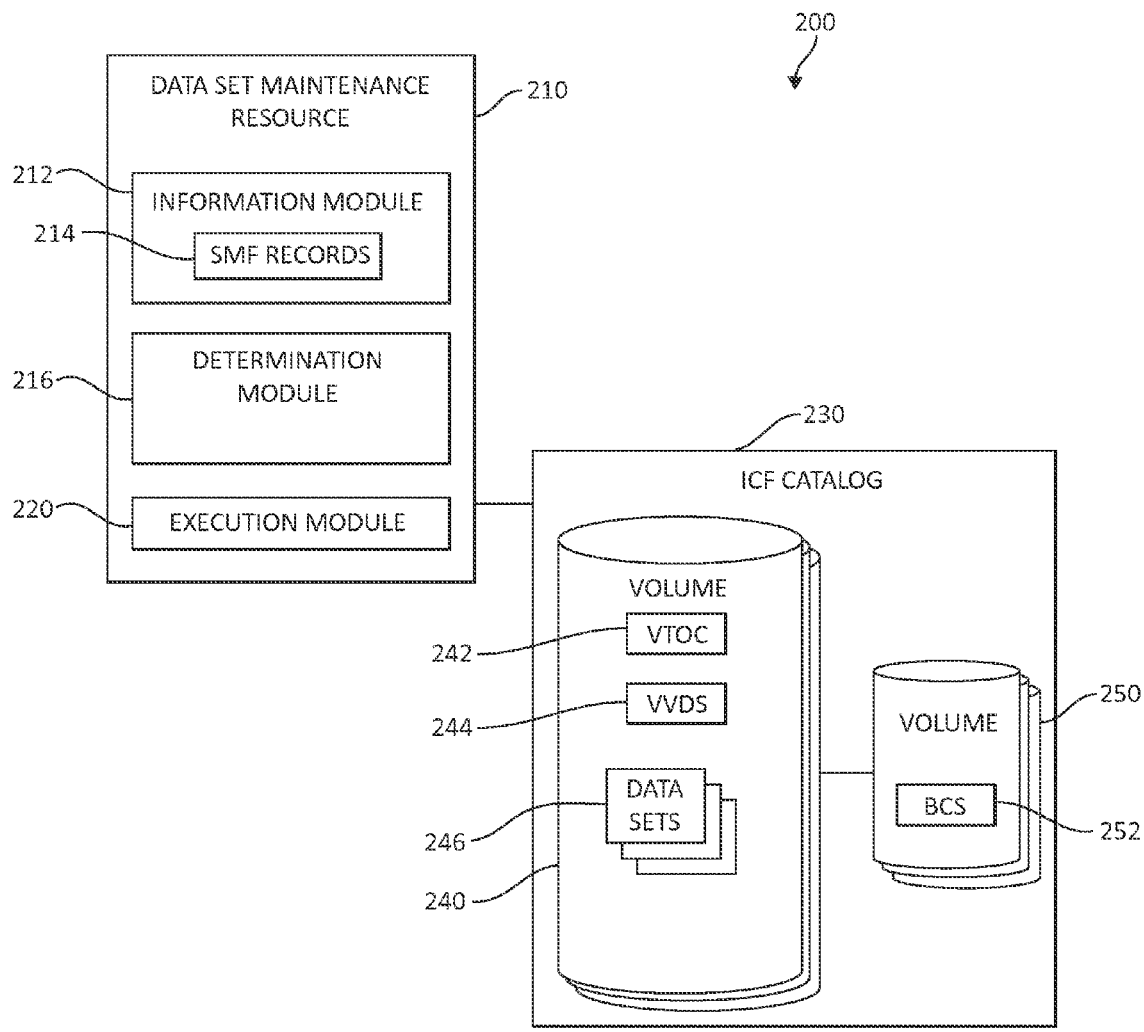
FIG. 2 is an exemplary data set maintenance resource.

FIG. 2 depicts one embodiment of a DASD environment comprising a data set maintenance resource and an integrated catalog facility (ICF) catalog in accordance with the present invention. The DASD environment 200 includes a data set maintenance resource 210, an information module 212, system management facility (SMF) records 214, a determination module 216, and an execution module 220. ICF catalog 230 includes a volume 240, a volume table of contents (VTOC) 242, a VSAM volume data set (VVDS) 244, data sets 246, diagnostic data set components 248 associated with the data sets 246, a volume 250, and a basic catalog structure (BCS) 252.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may be used by the data set maintenance resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents. The relationship between the BCS 252, VVDS 244, and VTOC 242 is not exclusive.

In the depicted embodiment, the data set maintenance resource 210 includes the information module 212, the determination module 216, and the execution module 220. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job. The data set maintenance resource 210, in one embodiment, facilitates the execution of ACS routines. ACS routines are a sequence of instructions for having the system assign SMS classes and groups to data sets and objects. The selection of specific classes and groups is based on information from JCL or other allocation parameters. ACS routines may use parameters, such as data set name, volume serial number, job name, and data set size, to assign classes and groups to data sets.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed. Other information retrieved by the information module may include a data set name, catalog status, the type entry in the catalog such as the type of data set or the VSAM index of a VSAM data set, or associated data set names if applicable. The information module 212 includes SMF records 214 in a data repository for tracking such actions as opening a file, closing a file, and catalog updates of VSAM data sets. Other information retrieved by the information module may include a data set name, catalog status, the type entry in the catalog such as the type of data set or the VSAM index of a VSAM data set, or associated data set names if applicable. The information retrieved may further include identification of data sets to bypass during the recovery.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In the depicted embodiment, the determination module 214 determines one or more data set maintenance operations to perform. The determination module 214 may examine VTOC and/or VVDS information, including data set-specific diagnostic information to determine one or more operations to perform, such as operations pursuant to allocating a data set to a particular job or storage resource as one of ordinary skill in the art will appreciate.

The execution module 220 executes the one or more generated control statements to perform various operations on the data sets 246. The execution module may be adapted to execute unmodified or modified ACS routines, as will be further described.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set recovery resource 210 reside on the DASD 140. The data set maintenance resource 210 may act on the ICF catalog 230 and its components to perform operations relating to the allocation and maintenance of data sets using ACS routines, for example.

An important instruction found ACS routines is a SET instruction, which sets the desired SMS construct as one of ordinary skill in the art will appreciate. Following execution of the SET instruction, the routine generally immediately exits. The routines themselves are serially executed. Knowledge of which SETs are executed the most, and where they are located within the ACS routine is information that may be put to productive use.

In view of the foregoing, one of the illustrated embodiments makes use of the aforementioned knowledge about SET instruction(s) within a particular ACS routine. In such an exemplary embodiment, a table may be instituted reflective of where each of the SET instructions are within a particular ACS routine or routines. When each SET instruction is executed, a counter may be incremented to record the frequency of use, for example. The user may then tailor the ACS routine to move the most frequently used SETs to the beginning of the routine, and alternatively, move the least used SETs to the end of the routine.

In other embodiments, the mechanisms of the present invention may be adapted to allow for automated ACS routine tuning functionality. The user may chose a tuning time frame, or the optimal period for modification of such routine may be determined. The time frame may be based on a day of the week, for example, or hour periods in a 24-hour period. As previously described, if a computer storage environment executes batch processing at midnight until 4:00 A.M., for example, the type of processing will differ than typical online production, which may occur from 4:00 A.M. until midnight. In addition, the day of the week may have differing times for batch processing. For example, some users may have more batch processing, such as backup operations, taking place on Sunday with reduced accompanying online activity. In these cases, the user may manually identify these time interval windows. In an alternative embodiment, the mechanisms of the present invention may be adapted to identify changes in SET activity, for example, to identify the applicable time interval window.

Once the optimization windows have been identified, the SET data may be analyzed and the ACS routines optimized. In one embodiment, for example, the most frequently used SET commands may be moved to the top (or at least in a higher execution priority) to allow for the shortest execution path. Each routine may be optimized for the applicable specific time interval window. As the user's processing moves from one type of production to another (as time passes), the ACS routines may be automatically switched to the optimal ACS routine for that time interval window.

Periodically, the monitoring activity may take place while optimized ACS routines are running. If this is the case, for example, the information may be logged, and after a set number of periods may be re-analyzed to ensure that the most appropriate ACS routine(s) continue to be optimized for the particular time interval window in question. If this is not the case, the ACS routine may then be adjusted again, and will be used in a subsequent time window.

In view of the foregoing example, consider the following exemplary embodiment. As previously mentioned, in ACS routines the SET command is important due to its functionality for assigning an applicable class. The ACS routine contains filter criteria which determines which class to set. In the following exemplary embodiment, a count of how many times the SET command is executed for a five minute time period is taken. These counts may be obtained in several instances over a 24 hour period, for example.

Following the recording of such counts, a compilation of these counts may be performed in a list. The list may then be analyzed to determine times in the 24 hour period (or days of the week, for example) where drastic changes in SET activity are observed. A unique ACS routine is then constructed that is optimized for such drastic changes in SET activity as identified by the foregoing analysis. The filtering which executes the set may then be ordered, so that the most frequently executed SET command is at the top (or again, positioned at least in a higher execution order) of the routine. Similarly, the least frequently executed SET command may be placed at the bottom (or again, positioned at least in a lower execution order) of the routine. As the applicable time window changes corresponding to a differing processing period (e.g., switching from normal operation to batch processing), execution of such routines may be adjusted so that the applicable optimized routine is executed for a particular time interval window.

FIGS. 3A-3C, following illustrate exemplary embodiments of exemplary ACS routines. First, in FIG. 3A, an exemplary unoptimized ACS routine 300 written by a user is illustrated. In FIG. 3B, an exemplary ACS routine 310 is illustrated that has been optimized for a non-payroll window. Finally, in FIG. 3C, an exemplary ACS routine 320 is illustrated that has been optimized for a payroll window. In light of the following discussion, one of ordinary skill in the art will appreciate that the following illustrations and description are exemplary in nature and reflect possible embodiments of the mechanisms of the present invention.

In the depicted embodiments, the mechanisms of the present invention track how often each STORCLAS class is set during a particular time window. The time window may be set by the user, or predetermined time intervals may be tracked (e.g., five minute intervals). When SET patterns change, the changes may be identified. Accordingly, an optimal set of time windows may be obtained. For example, in view of the following simple set of commands, assume that the user normally has most data sets allocated to DB2 during most processing except for Sunday between 1:00 and 3:00 A.M., when payroll processing ends. In view of this example, the SET activity may be compared for five-minute intervals. As a result of an analysis of such SET activity, a determination may be made that DB2 has most of the SET activity, followed by TSO, and no payroll activity until the window between 1:00 and 3:00 A.M. on Sunday. Based on the above analysis, two optimized ACS routines result. The first is optimized for most of the week (and appears in FIG. 3B), which has DB2 at the top, and payroll at the bottom. In the second optimized ACS routine (which appears in FIG. 3C), payroll is at the top of the routine. The other entries in the ACS routine also are sorted based on their usage.

Figure 4:
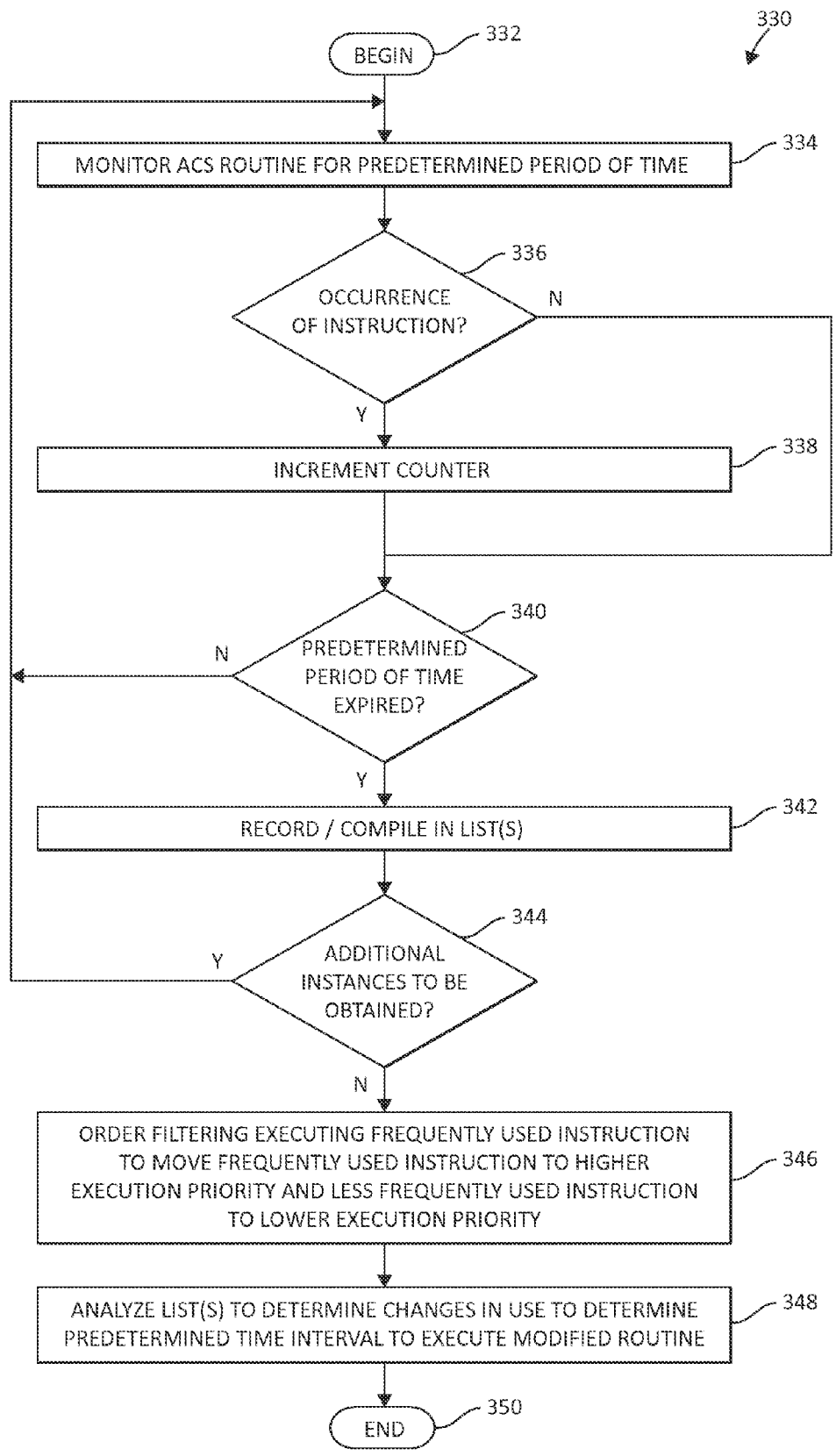
FIG. 4 is an exemplary method for optimizing automated system-managed storage (SMS) operations in a computing storage environment.

Turning now to FIG. 4, a logic flow diagram of an exemplary method 330 for optimizing automated SMS operations (such as ACS routines) in a computing storage environment is depicted. As one skilled in the art will appreciate, the described method may be implemented by various means, such as hardware, software, firmware, or a combination thereof operational on or otherwise associated with the computing storage environment. For example, the method 330 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. The method 330 may be carried out by various components of the data set maintenance resource 210 (FIG. 2), as previously described, such as by various data set modules.

Method 330 begins (step 332) with the monitoring of an ACS routine for a predetermined period of time (e.g., a five-minute interval or for a predetermined operational window). If occurrences of execution of a particular instruction are identified (step 336), a counter is incremented to document such an occurrence (step 338). The monitoring of the ACS routine continues until the predetermined period of time expires (step 340) at which time the occurrences are recorded and compiled in a list (step 342).

As previously mentioned, a number of instances of the monitoring/recording may be obtained (for example, during each of a number of five-minute intervals for an hour period of time). If additional instances are to be obtained (step 344), the method 330 returns to step 334 as previously described, and steps 336-344 are again performed as necessary. If the number of instances are sufficient for the particular situation, the method 330 orders the filtering executing the frequently used instruction at issue to move the frequently used instruction to a higher execution priority (e.g., to the top of the routine), and a less frequently used instruction to a lower execution priority (e.g., to the bottom of the routine (step 346). The list(s) may be periodically analyzed to determine changes in use of the frequently used instruction, for example, to make determinations of whether the applicable predetermined time interval (time window) has shifted to execute the modified ACS routine (step 348). The method 330 then ends (step 350).

Figure 5:
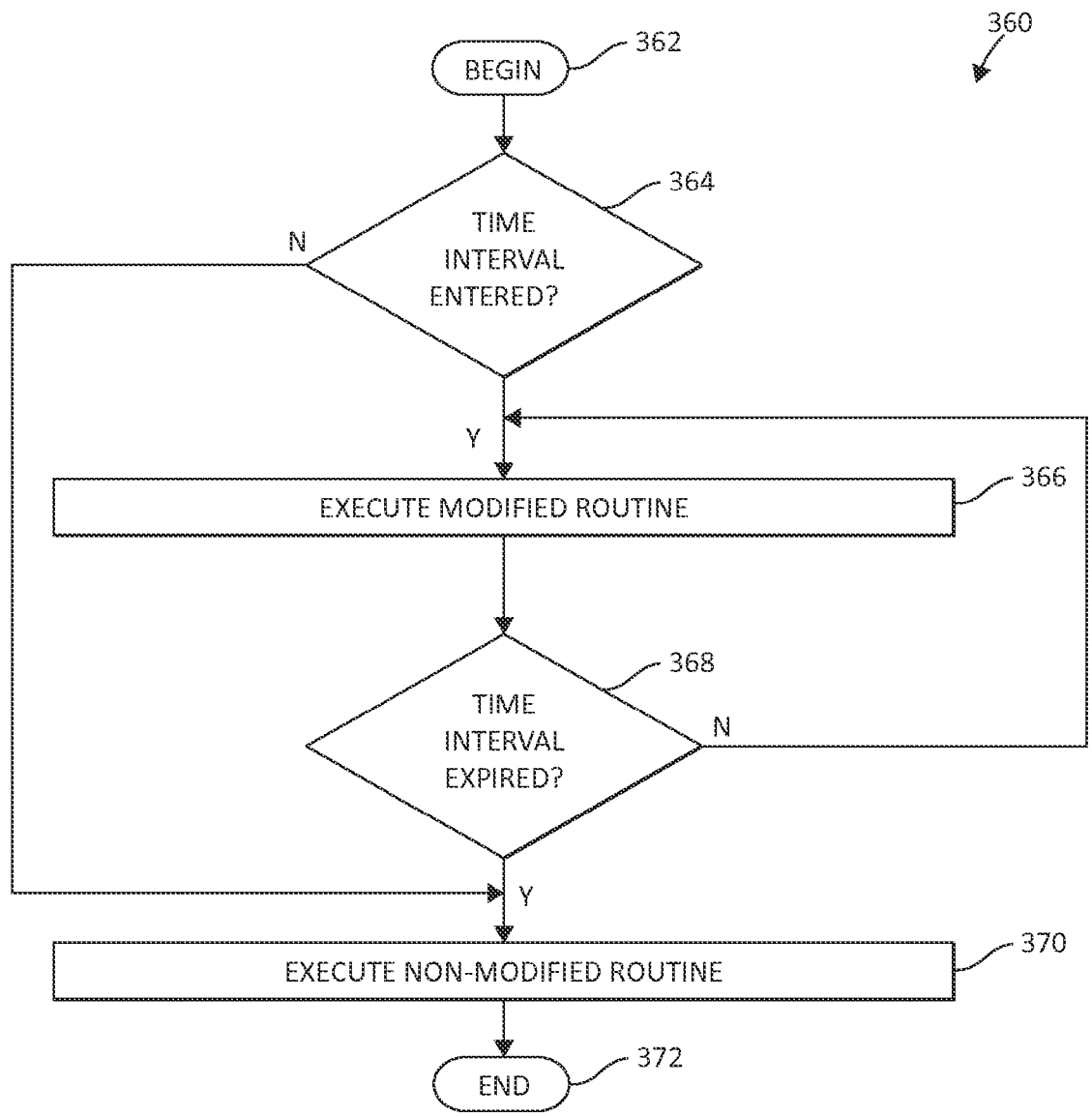
FIG. 5 is an exemplary method for executing optimized SMS operations pursuant to the previous exemplary functionality described in FIG. 4.

FIG. 5, following, is a logic flow diagram illustrating an exemplary method 360 for executing ACS routines in view of the mechanisms of the illustrated embodiments, and further in view of the functionality described previously in FIG. 4. Method 360 begins (step 362) with a determination of whether the applicable time interval for a particular modified ACS routine has been entered (step 364). If so, the modified ACS routine is executed (step 366), otherwise the method 360 moves to step 370 as will be further described. If the time interval has expired (step 368), the method 360 then moves to execute a default, non-modified routine, or in another embodiment, execute an additional modified routine optimized for the new time interval (step 370). The method then ends (step 372).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for optimizing automated system-managed storage (SMS) operations in a computing storage environment by a processor device, comprising:
monitoring, by a processor, an execution of at least one automatic class selection (ACS) routine comprising a plurality of instructions;
tracking a number of times each instruction of the plurality of instructions is used during a predetermined time interval for a number of instances, each used instruction is counted, wherein the predetermined time interval based on one of a user-selected time interval;
compiling a list of the number of instances, the list of the number of instances including a list of counts of frequency of use for each used instruction;
analyzing the list of the number of instances for utilization of the each used instruction to determine a priority for the each used instruction based on the list of counts of frequency of use for the each used instruction; and
optimizing the ACS routine by modifying the ACS routine for the predetermined time interval based on the priority of the each used instruction, wherein optimizing the ACS routine includes ordering a filter executing the plurality of instructions to move more frequently used instructions to a higher execution priority order and move less frequently used instructions to a lower execution priority order in the ACS routine.

2. The method of claim 1, further including executing the modified ACS routine at the predetermined time interval.

3. The method of claim 1, wherein at least one of the plurality of instructions is a SET instruction, and tracking the ACS routine includes incrementing a counter when each SET instruction is utilized.

4. The method of claim 1, wherein the optimizing the ACS routine further includes ordering the filter executing the plurality of instructions to move a most frequently used instruction to a highest execution priority and move a least frequently used instruction to a lowest execution priority in the modified ACS routine.

5. The method of claim 1, further including selecting the predetermined time interval based on a level of processing activity.

6. The method of claim 1, further including analyzing the list of the number of instances to determine changes in use of the plurality of instructions to determine the predetermined time interval.

7. A system for optimizing automated system-managed storage (SMS) operations in a computing storage environment, comprising:
a data set module operational in the computing storage environment; and
a processor configured for executing the data set module, wherein the data set module is adapted for:
monitoring an execution of at least one automatic class selection (ACS) routine comprising a plurality of instructions,
tracking a number of times each instruction of the plurality of instructions is used during a predetermined time interval for a number of instances, each used instruction is counted, wherein the predetermined time interval based on one of a user-selected time interval,
compiling a list of the number of instances, the list of the number of instances including a list of counts of frequency use for each used instruction,
analyzing the list of the number of instances for utilization of the each used instruction to determine a priority for the each used instruction based on the list of counts of frequency of use for the each used instruction, and
optimizing the ACS routine by modifying the ACS routine for the predetermined time interval based on the priority of the each used instruction, wherein optimizing the ACS routine includes ordering a filter executing the plurality of instructions to move more frequently used instructions to a higher execution priority order in the ACS routine.

8. The system of claim 7, wherein the data set module is further adapted for executing the modified ACS routine at the predetermined time interval.

9. The system of claim 7, wherein at least one of the plurality of instructions is a SET instruction, and the data set module is further adapted for, pursuant to tracking the ACS routine, incrementing a counter when each SET instruction is utilized.

10. The system of claim 7, wherein the data set module is further adapted for, pursuant to optimizing the ACS routine, includes ordering the filter executing the plurality of instructions to move a most frequently used instruction to the highest execution priority and move a least frequently used instruction to a lowest execution priority in the modified ACS routine.

11. The system of claim 7, wherein the data set module is further adapted for selecting the predetermined time interval based on a level of processing activity.

12. The system of claim 7, wherein the data set module is further adapted for analyzing the list of the number of instances to determine changes in use of the plurality of instructions to determine the predetermined time interval.

13. A computer program product for optimizing automated system-managed storage (SMS) operations in a computing storage environment, the computer program product comprising a non-transitory computer-readable storage medium having computer-readable program code portions stored therein, the computer-readable program code portions comprising:

a first executable portion for monitoring, by a processor, an execution of at least one automatic class selection (ACS) routine comprising a plurality of instructions;

a second executable portion for tracking a number of times each instruction of the plurality of instructions is used during a predetermined time interval for a number of instances, each used instruction is counted, wherein the predetermined time interval based on one of a user-selected time interval;

a third executable portion for compiling a list of the number of instances, the list of the number of instances including a list of counts of frequency use for each used instruction;

a fourth executable portion for analyzing the list of the number of instances for utilization of the each used instruction to determine a priority for the each used instruction based on the list of counts of frequency of use for the each used instruction; and a fifth executable portion for optimizing the ACS routine by modifying the ACS routine for the predetermined time interval based on the priority of the each instruction, wherein optimizing the ACS routine includes ordering a filter executing the plurality of instructions to move more frequently used instructions to a higher execution priority order in the ACS routine.

14. The computer program product of claim 13, further including a sixth executable portion for executing the modified ACS routine at the predetermined time interval.

15. The computer program product of claim 13, wherein at least one of the plurality of instructions is a SET instruction, and further including a sixth executable portion for monitoring the ACS routine includes incrementing a counter when each SET instruction is utilized.

16. The computer program product of claim 13, further including a sixth executable portion for pursuant to optimizing the ACS routine, including ordering the filter executing the plurality of instructions to move a most frequently used instruction to the highest execution priority and move a least frequently used instruction to a lowest execution priority in the modified ACS routine.

17. The computer program product of claim 13, further including a sixth executable portion for selecting the predetermined time interval based on a level of processing activity.

18. The computer program product of claim 13, further including a sixth executable portion for analyzing the list of the number of instances to determine changes in use of the plurality of instructions to determine the predetermined time interval.

* * * * *